(12) United States Patent
Krishnamurthy

(10) Patent No.: US 8,176,324 B1
(45) Date of Patent: May 8, 2012

(54) METHOD AND SYSTEM FOR A SECURE VIRTUAL KEYBOARD

(75) Inventor: Hema Krishnamurthy, Phoenix, AZ (US)

(73) Assignee: Exelis Inc., McLean, VA (US)

( * ) Notice: Subject to any disclaimer, the term of this patent is extended or adjusted under 35 U.S.C. 154(b) by 372 days.

(21) Appl. No.: 12/458,192

(22) Filed: Jul. 2, 2009

(51) Int. Cl.
*G06F 21/00* (2006.01)
*H04L 9/32* (2006.01)
*H04L 9/00* (2006.01)
*G06Q 40/00* (2012.01)

(52) U.S. Cl. .............. 713/168; 380/45; 705/39
(58) Field of Classification Search ........... 713/150–194
See application file for complete search history.

(56) References Cited

U.S. PATENT DOCUMENTS

| 6,246,769 B1* | 6/2001 | Kohut | 380/45 |
| 2005/0075973 A1* | 4/2005 | Yousofi | 705/39 |
| 2005/0109841 A1* | 5/2005 | Ryan et al. | 235/380 |
| 2005/0160297 A1* | 7/2005 | Ogawa | 713/202 |

OTHER PUBLICATIONS

Andrew Tanenbaum, Computer Networks, 2003, Prentice Hall, Fourth Edition, 737, 753, 775.*
Madentec Solutions, ScreenDoors 2000 User Guide, Jan. 13, 2007, V2.14, 34, 35.*

* cited by examiner

*Primary Examiner* — Shin-Hon Chen
(74) *Attorney, Agent, or Firm* — Davidson Berquist Jackson & Gowdey LLP

(57) ABSTRACT

Methods and systems provide a secure virtual keyboard represented as an onscreen keyboard with multiple levels of security. The secure virtual keyboard provides keys that are a combination of numerals, alphabets and special characters. Different security features provided include, but are not limited to, randomly changing the key layout, providing an option for mouse-hover input, and using a secure encrypted transmission path.

24 Claims, 8 Drawing Sheets

METHOD AND SYSTEM FOR A SECURE VIRTUAL KEYBOARD

This generally relates to virtual keyboards, and more particularly to secure virtual keyboards and related devices.

BACKGROUND

Virtual keyboards, alternatively known as onscreen keyboards, provide a way for the user to bypass the traditional keyboard if the user so desires, or the particular application requires it. A virtual keyboard is a keyboard represented on a screen displaying keys typically found on a real keyboard. A virtual keyboard on a screen can usually be operated with an actual keyboard, a mouse or even touch screen input. Several conventional virtual keyboards available in the market provide different key layouts and multi-lingual configurations. Implemented in many different ways, virtual keyboards may be provided by applications resident on a computer which can be launched by clicking on them with a mouse, or may be embedded in web pages for Internet websites such as banking websites.

Both hardware and software-based key logging applications are used by computer hackers to maliciously capture the keystrokes from a user's keyboard. This in turn can be used to gather passwords, personal identification numbers (PIN) and other crucial information. Virtual keyboards are commonly used to avert these key loggers. Although it is possible for malware to capture information through mouse movements, it is significantly harder than monitoring real keystrokes. Additionally, there is the possibility of the data being captured and modified in the path from the keyboard application to the device/application with which the virtual keyboard is communicating.

Although many conventional virtual keyboard solutions exist, they typically do not provide adequate security measures. Additionally, hardware products such as conventional USB products typically use a regular keyboard for password entry when connected to a computer, thus providing inadequate security. Accordingly, there is a desire for a more secure virtual keyboard that avoids these and other related problems.

SUMMARY

In accordance with methods and systems consistent with the present invention, a method in a data processing system for a secure virtual keyboard is provided comprising displaying a virtual keyboard having keys on a display, and displaying the virtual keyboard with a different layout of the keys on the display on a subsequent display of the virtual keyboard. The method further comprises receiving an indication of a minimum time to hover a mouse pointer over a key on the virtual keyboard to activate the key. Additionally, the method comprises receiving an indication of the mouse pointer being over the key, determining if the mouse pointer is over the key longer than the indicated minimum time to hover, and entering the key if it is determined that the mouse pointer is over the key longer than the indicated minimum time to hover. Moreover, the method comprises encrypting a transmission to a device communicating with the virtual keyboard, and transmitting the encrypted transmission to the device communicating with the virtual keyboard.

In accordance with an implementation, a data processing system for a secure virtual keyboard is provided comprising a display configured to display a virtual keyboard, and a mouse configured to control a mouse pointer on the display. The data processing system further comprises a memory configured to store instructions to instruct a processor to display the virtual keyboard having keys on the display, and display the virtual keyboard with a different layout of the keys on the display on a subsequent display of the virtual keyboard. The instructions further instruct the processor to receive an indication of a minimum time to hover the mouse pointer over a key on the virtual keyboard to activate the key, receive an indication of the mouse pointer being over the key, determine if the mouse pointer is over the key longer than the indicated minimum time to hover, and enter the key if it is determined that the mouse pointer is over the key longer than the indicated minimum time to hover. Finally, the instructions instruct the processor to encrypt a transmission to a device communicating with the virtual keyboard, and transmit the encrypted transmission to the device communicating with the virtual keyboard. The data processing system also comprises a processor to execute the instructions.

In accordance with another implementation, a method in a data processing system for a secure virtual keyboard is provided comprising changing a layout of keys on a subsequent launch of a virtual keyboard after a first launch of the virtual keyboard, and indicating one or more keys to be entered on the virtual keyboard by moving the mouse pointer over the one or more keys. The method further comprises encrypting information corresponding to the one or more indicated keys, and transmitting the information corresponding to the one or more indicated keys.

DETAILED DESCRIPTION

Figure 1:
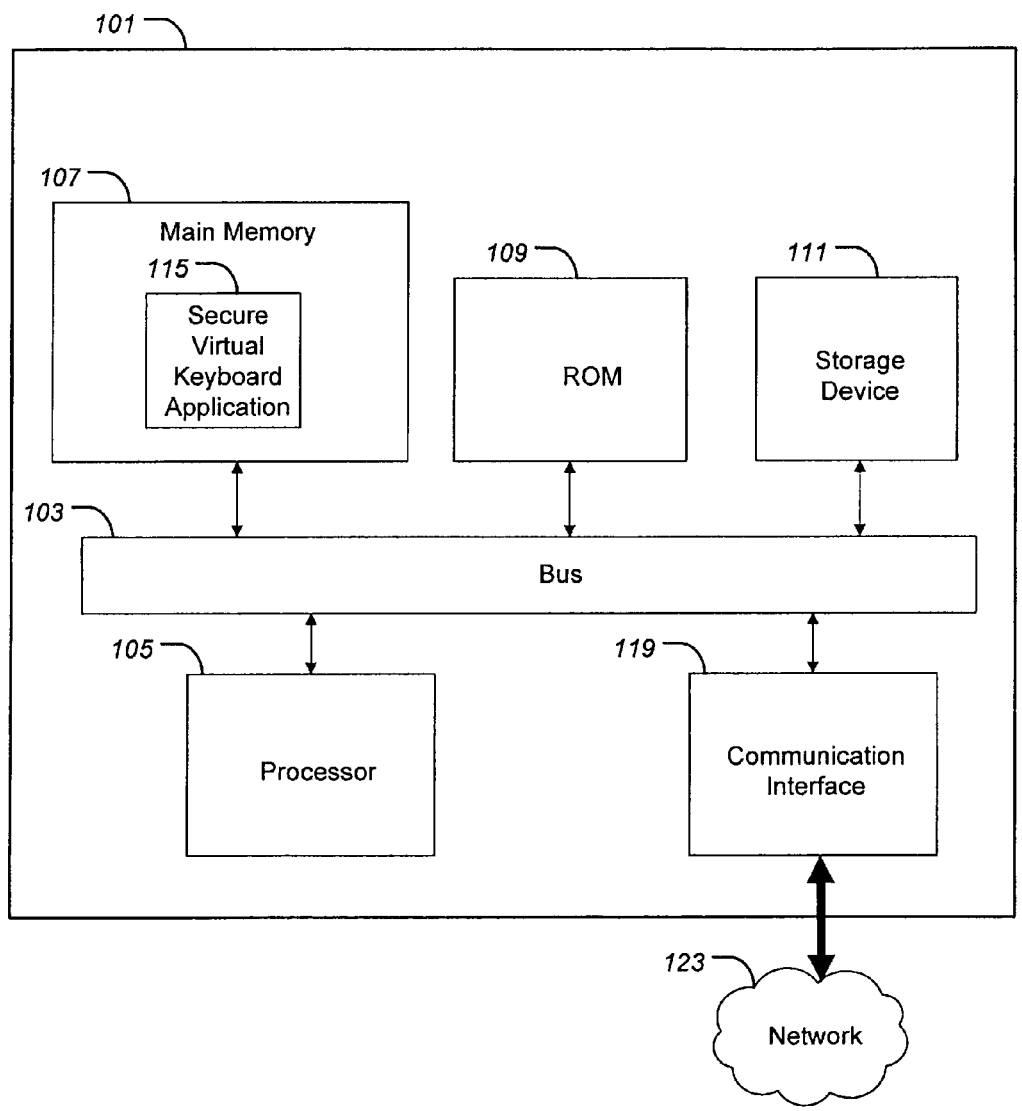
FIG. 1 illustrates an exemplary computer system consistent with systems and methods consistent with the present invention.

Methods and systems in accordance with the present invention provide a secure virtual keyboard represented as an onscreen keyboard with multiple levels of security. The secure virtual keyboard provides keys that are a combination of numerals, alphabets and special characters. Different security features provided include, but are not limited to, randomly changing key layout, option for mouse-hover input, and use of a secure encrypted and integrity-verified transmission path.

In one implementation, the layout of the keys changes randomly each time the secure virtual keyboard application is opened. This provides an extra layer of security to protect users against key loggers since the location of the keys is not known ahead of time. In another implementation, the secure virtual keyboard application provides options for keys to be activated on a mouse click or on the mouse hovering over the key without a click. The mouse hovering option prevents key captures that might occur with clicks, and provides the user with the added flexibility of selecting the minimum time to hover over each key for the key to be activated.

In another implementation, in addition to the above security mechanisms, the secure virtual keyboard application provides a secure trusted path from the application to the device, using public key encryption methods such as Rivest-Shamir-Adleman (RSA) and Diffie-Hellman (DH) encryption protocols. Public key encryption systems provide confidentiality wherein a message which a sender encrypts using the recipient's public key can be decrypted only by the recipient's paired private key. In addition, authentication/integrity mechanisms using hash or Message Authentication Code (MAC) algorithms ensure that the transmission is not modified in transit. Thus, passive or active eavesdroppers are not able to acquire and/or modify a password while it is in transit from the application to the device. The encryption protocol may also be a symmetric encryption protocol or any other encryption protocol. The authentication/integrity mechanisms may use hash or MAC protocols, or any other suitable protocol.

Secure virtual keyboards can be used with various applications like websites (e.g., banking, online purchases), applications communicating with secure devices (e.g., USB, cell phones) and any other applications that need to discourage key loggers from capturing keystrokes entered by a user. Secure virtual keyboards are particularly useful for password or PIN entry, for example, for secure websites such as an online banking systems. With this method, the secure virtual keyboard avoids the problem of a computer hacker stealing the password information.

In one implementation, the secure virtual keyboard application is stored on a secure USB device that may be connected to a computer. In addition to the secure virtual keyboard application, this secure USB device may also store files and other data. The user may access the application on the device to activate the secure virtual keyboard for use with the connected host computer.

FIG. 1 illustrates an exemplary computer system consistent with systems and methods consistent with the present invention. The computer 101 includes a bus 103 or other communication mechanism for communicating information, and a processor 105 coupled with bus 103 for processing the information. The computer 101 also includes a main memory 107, such as a random access memory (RAM) or other dynamic storage device, coupled to bus 103 for storing information and instructions to be executed by processor 105. In addition, main memory 107 may be used for storing temporary variables or other intermediate information during execution of instructions to be executed by processor 105. Main memory 107 includes a program 115 for implementing processing consistent with methods and systems in accordance with the present invention. The main memory 107 may store a secure virtual keyboard application 115 which may contain executable instructions for implementing the secure virtual keyboard. As discussed below, this application 115 may be stored on a secure USB device or stored on a website server, such as in the case of an online banking system. The secure virtual keyboard application 115 may be software or hardware and may be stored in any suitable location or on any suitable component. The computer 101 further includes a Read-Only Memory (ROM) 109 or other static storage device coupled to bus 103 for storing static information and instructions for processor 105. A storage device 111, such as a magnetic disk or optical disk, is provided and coupled to bus 103 for storing information and instructions.

According to one embodiment, processor 105 executes one or more sequences of one or more instructions contained in main memory 107. Such instructions may be read into main memory 107 from another computer-readable medium, such as storage device 111. Execution of the sequences of instructions in main memory 107 causes processor 105 to perform processes described herein. One or more processors in a multi-processing arrangement may also be employed to execute the sequences of instructions contained in main memory 107. In alternative embodiments, hard-wired circuitry may be used in place of or in combination with software instructions. Thus, embodiments are not limited to any specific combination of hardware circuitry and software.

Although described relative to main memory 107 and storage device 111, instructions and other aspects of methods and systems consistent with the present invention may reside on another computer-readable medium, such as a floppy disk, a flexible disk, hard disk, magnetic tape, a CD-ROM, magnetic, optical or physical medium, a RAM, a PROM, and EPROM, a FLASH-EPROM, any other memory chip or cartridge, or any other medium from which a computer can read, either now known or later discovered.

Computer 101 also includes a communication interface 119 coupled to bus 103. Communication interface 119 provides a two-way data communication coupling to a network link that is connected to a network 123, such as the Internet or other computer network. Wireless links may also be implemented. In any such implementation, communication interface 119 sends and receives signals that carry digital data streams representing various types of information.

In one implementation, computer 101 may operate as a web server on a computer network 123 such as the Internet. Computer 101 may also represent other computers on the Internet, such as users' computers having web browsers, and the user's computers may have similar components as computer 101.

Figure 2:
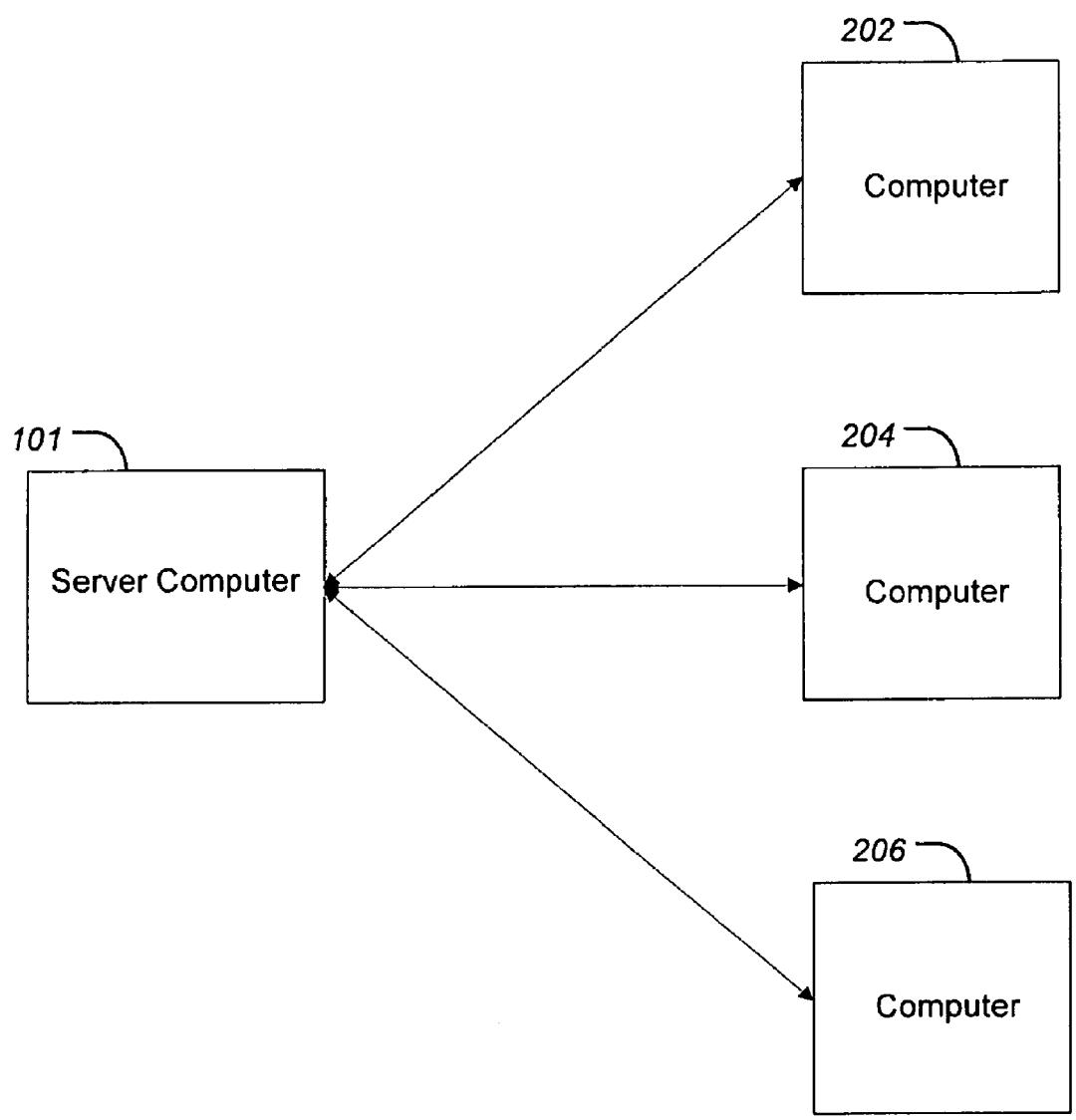
FIG. 2 shows an exemplary computer network such as the Internet having a web server for a website and computers used by users.

FIG. 2 shows an exemplary computer network such as the Internet having a web server for a website and computers used by various users. As described above, computer 101 may be a server having the components described above and may implement methods and systems consistent with the present invention. Computers 202-206 may include web browsers and may be used by users to access the Internet or other network and access computer server 101. There may be any number of user computers and any number of server computers. Users of computers 202-206, for example, may be initiate use of the secure virtual keyboard by accessing the website server 101. These computers may be operated by users interacting with a secure virtual keyboard.

Figure 3:
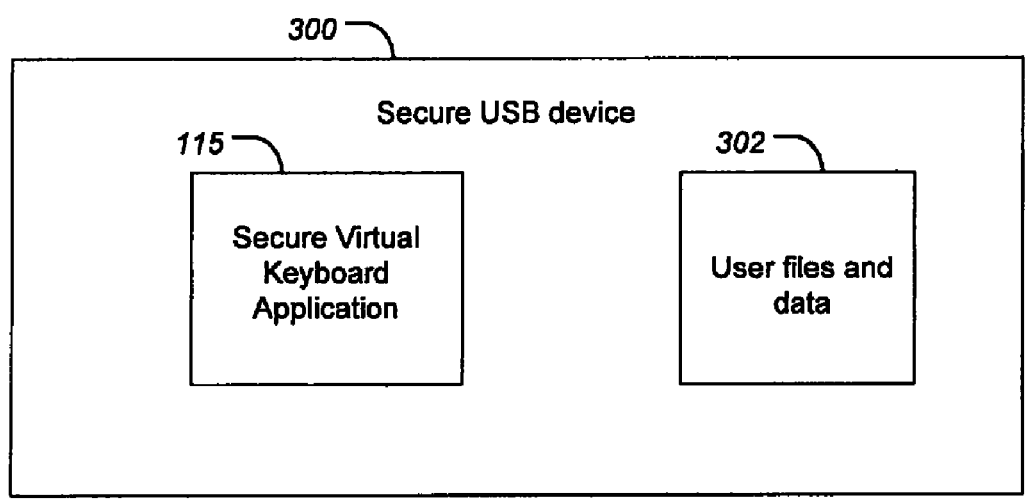
FIG. 3 depicts a secure USB device in accordance with methods and systems consistent with the present invention.

FIG. 3 depicts a secure USB device in accordance with methods and systems consistent with the present invention. The secure USB device 300 may store a secure virtual keyboard application 115 as well as files and data 302, for example, to be accessed by a user. When the secure USB device 300 is connected, the secure virtual keyboard application 115 allows the user to interact with the secure USB device by performing various actions such as logging in or formatting the device. One option is to activate a secure virtual keyboard. For example, if a user is on a public computer and wants to access their files 302 on the secure USB device 300 but does not want to use the regular computer keyboard to enter their password to access the secure USB, they may activate the secure virtual keyboard application 115 to do so. In this case, the secure virtual keyboard will be used to input the password, and the password will be encrypted, authenticated and validated before the files are opened. Although a secure USB component 300 is shown, other devices may be used.

The secure virtual keyboard implementation may generally include two primary components: an application responsible for launching the keyboard, and the onscreen keyboard window. When the user picks an operation that entails the use of a virtual keyboard, the secure virtual keyboard is launched.

Figure 4:
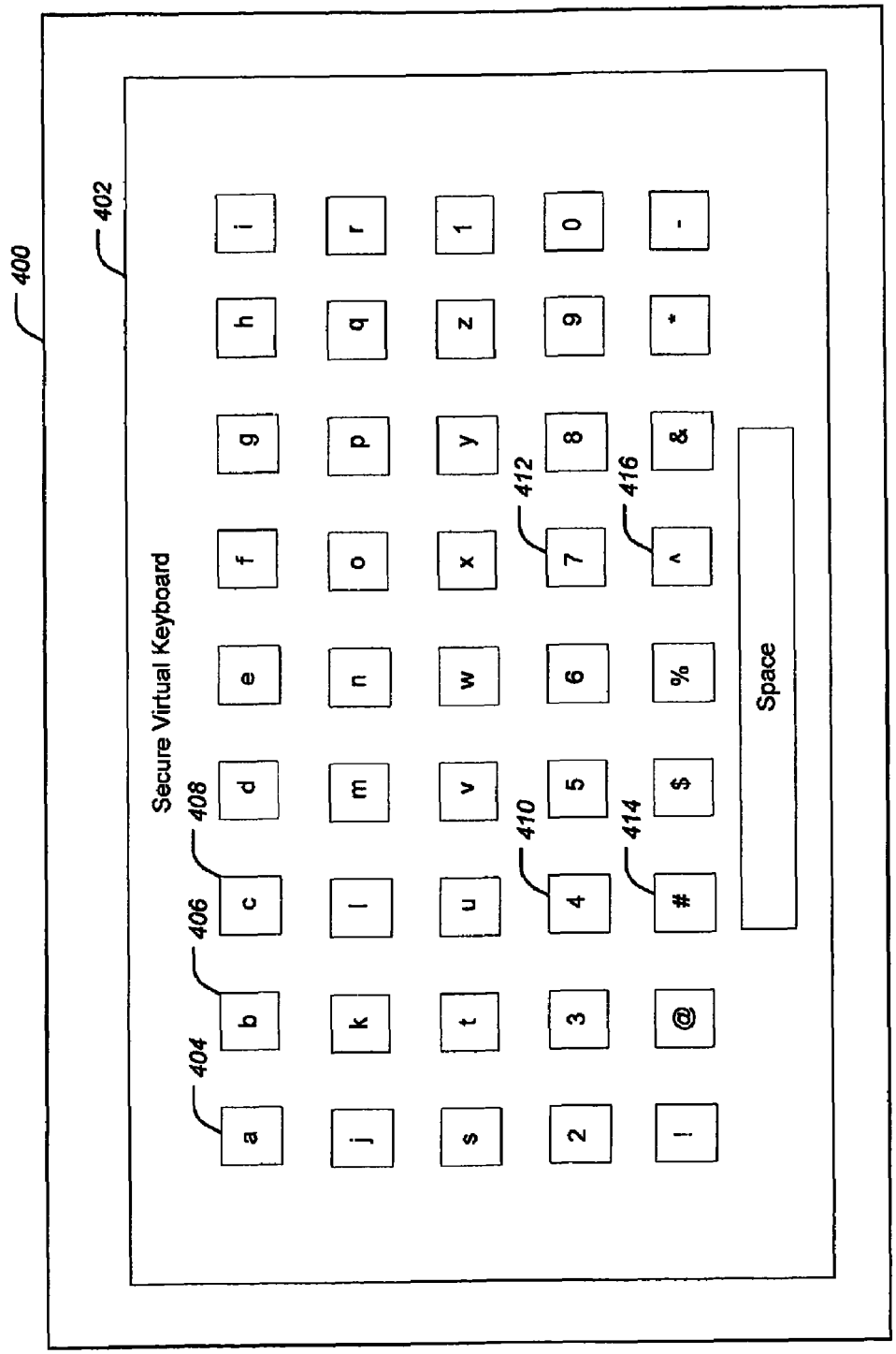
FIG. 4 depicts a screen showing an exemplary secure virtual keyboard in accordance with methods and systems consistent with the present invention.

FIG. 4 depicts a screen 400 showing an exemplary secure virtual keyboard in accordance with methods and systems consistent with the present invention. The secure virtual keyboard 402 is displayed on the screen when an application 115 is launched that uses the secure virtual keyboard. In the figure, many keys are shown on the keyboard 402, and the keyboard may have many other keys than the ones shown. Although keys 404-416 are labeled with numerals on the figure, many of the keys are not labeled with numerals. The secure virtual keyboard keys represent various letters, numbers and symbols that may be entered by a user.

Figure 5:
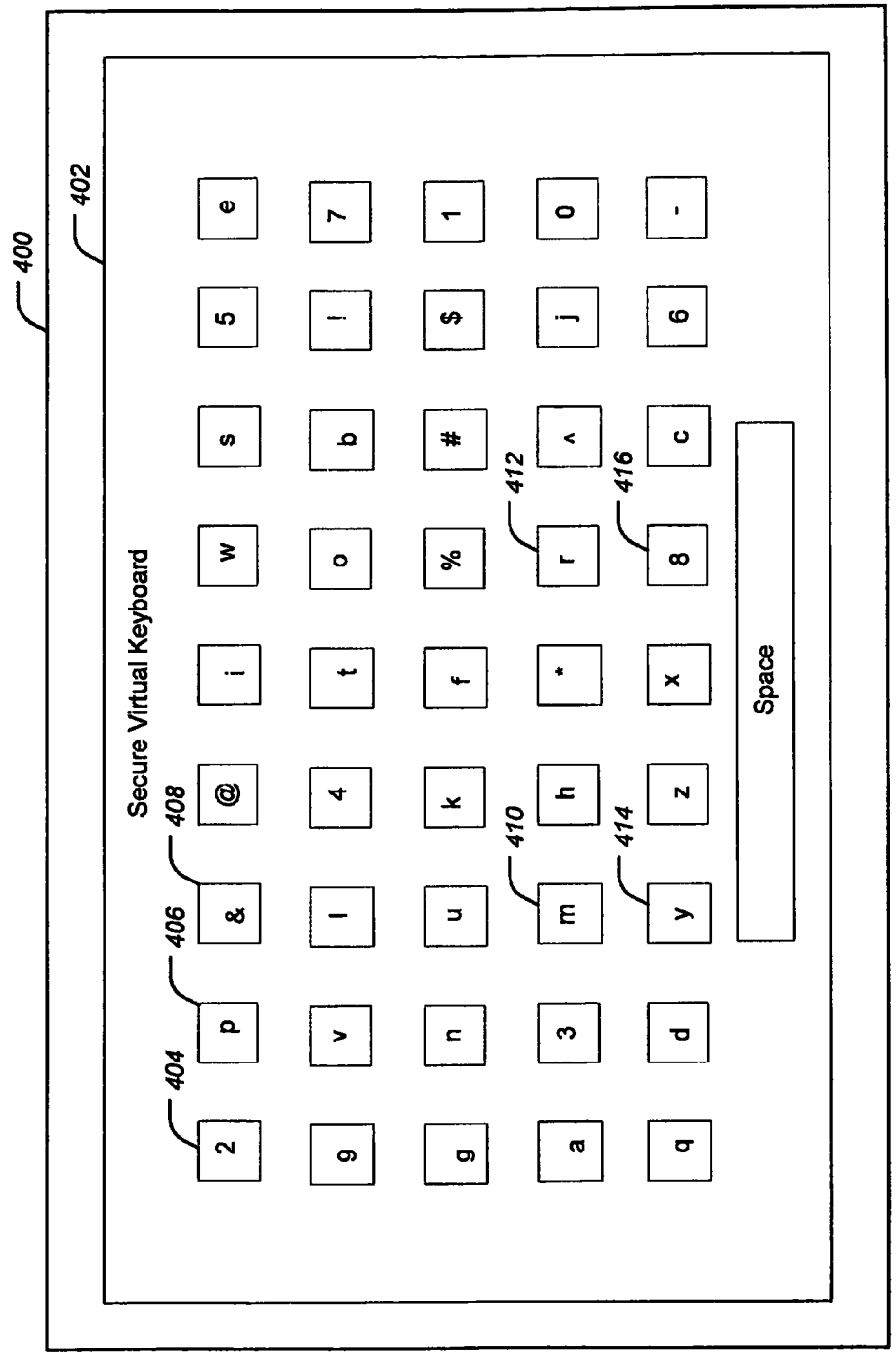
FIG. 5 depicts the secure virtual keyboard of FIG. 4 after a keyboard key layout change.

FIG. 5 depicts the secure virtual keyboard 402 of FIG. 4 after a keyboard key layout change. In one implementation, the layout of the keys on the keyboard 402 changes when the secure virtual keyboard application 115 is launched. As shown in the Figure, for example, keys 404-416 were previously a, b, c, 4, 7, # and ˆ respectively when the secure virtual keyboard application 115 was last launched (see FIG. 4), but when the application 115 is launched a subsequent time, the keyboard keys change, and for example, keys 404-416 are now different keys 2, p, &, m, r, y, and 8 respectively. Providing keys that change discourages key loggers since the location of the keys is not known in advance.

In another implementation, there are two ways in which the keys on the onscreen keyboard 402 can be activated. The keys can be activated through mouse clicks, i.e., each time the user clicks on a key, and the key content is captured, for example, in a password window (as shown below). However, other ways of activating the keys are also possible. Another option for key activation is through mouse hovering. The keys can be activated through the mouse pointer hovering over the button, i.e., when the user hovers the mouse pointer over a key for a certain amount of time, the key is activated and the content is captured.

Figure 6:
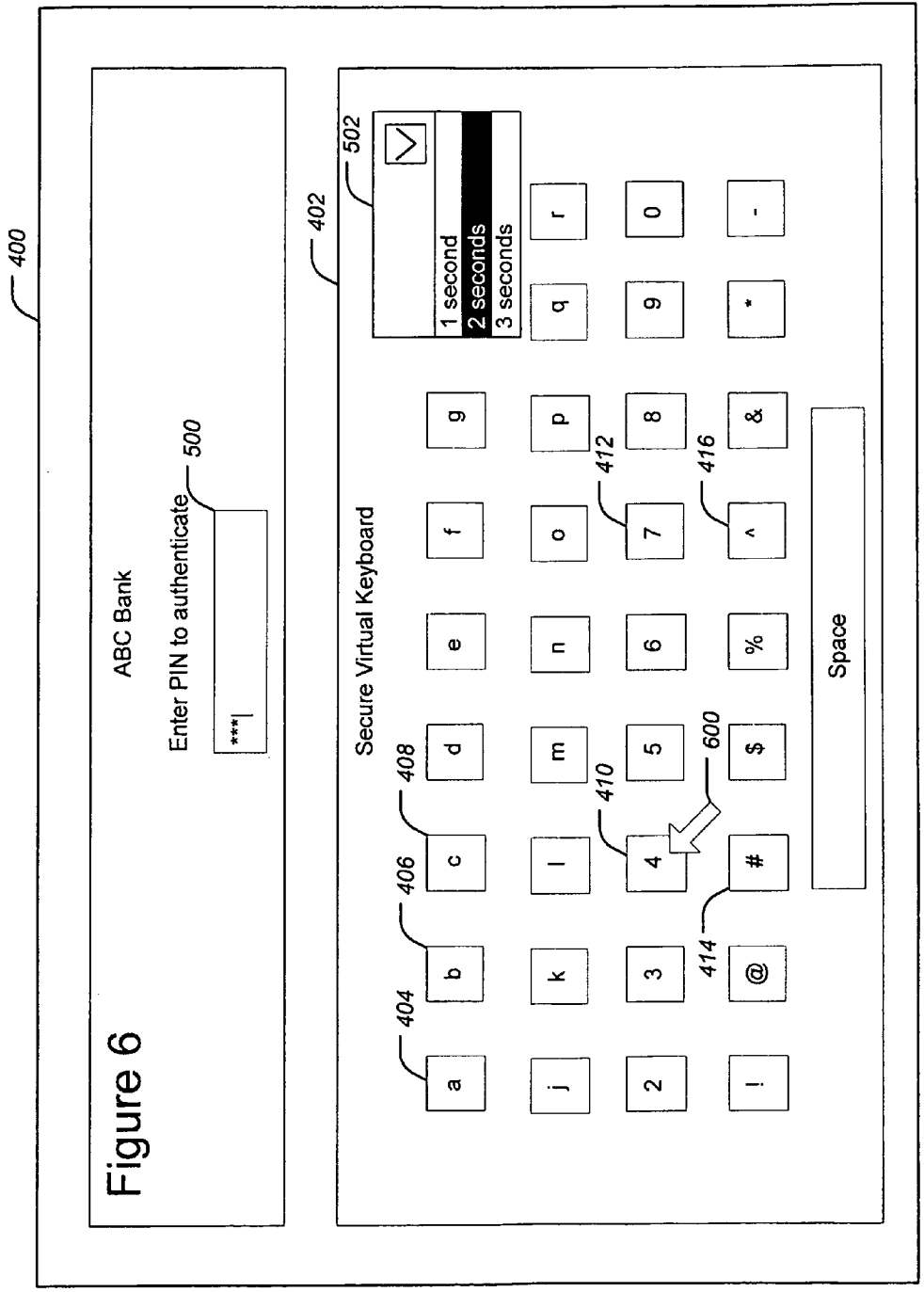
FIG. 6 depicts an exemplary secure virtual keyboard and a password window.
Figure 7:
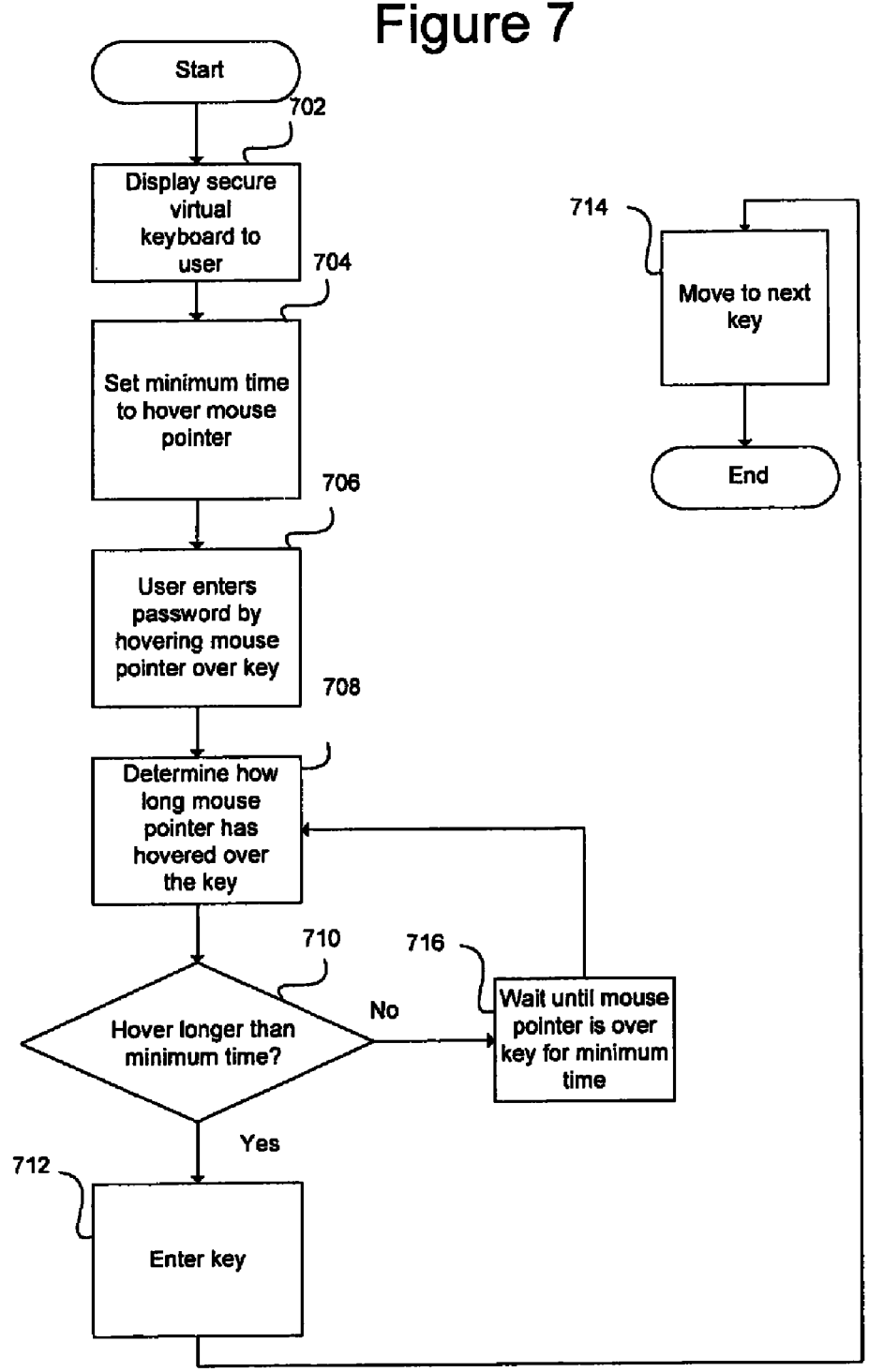
FIG. 7 depicts steps in an exemplary method for mouse hovering entry on a secure virtual keyboard.

FIG. 6 depicts an exemplary secure virtual keyboard 402 and a password window 500. FIG. 7 depicts steps in an exemplary method for mouse hovering entry on a secure virtual keyboard 402, and these steps are discussed in conjunction with FIG. 6. In FIG. 6, the system displays a secure virtual keyboard 402 to a user (step 702), and the user sets a minimum time to hover 502 for the mouse pointer 600 (step 704). The user also enters his or her password in the password window 500 by hovering the mouse pointer 600 over the desired key, for example, key 410 to select the number 4 (step 706). The system determines how long the mouse pointer 600 has hovered over the key 410 (step 708), and if it has hovered over the key 410 for the entered minimum time to hover 502 (step 710), it inputs the key (4), for example, in the password window 500 (step 712). If it has not, it waits until the mouse pointer 600 is over the key for the minimum amount of time 502 (step 714). When the user has entered a key, he or she may move the mouse pointer 600 to the next key (step 706) and hover again for the minimum time to hover 502 to indicate that key.

The secure virtual keyboard 402 provides additionally security by encrypting passwords using public key encryption algorithms like RSA. When a user enters a password, the password is encrypted using the public key of a public/private key pair generated beforehand, and sent to the recipient application or a device.

Figure 8:
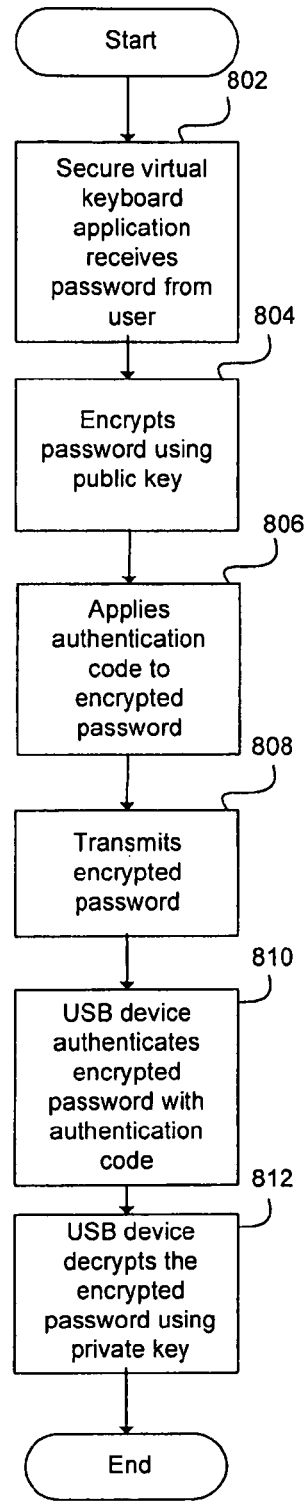
FIG. 8 depicts a flowchart of exemplary steps in method for encrypting and authenticating a transmission in a secure virtual keyboard in accordance with methods and systems consistent with the present invention.

FIG. 8 depicts a flowchart of exemplary steps in method for encrypting and authenticating a transmission in a secure virtual keyboard in accordance with methods and systems consistent with the present invention. The encryption feature prevents eavesdroppers from capturing the passwords while they are in transit, for example, between a computer and a secure USB device 300. The USB manager may be part of the secure virtual keyboard application 115 on the user's computer. Alternatively, the USB manager may also reside on the secure USB device 300, and transferred to the client computer. First, the secure virtual keyboard application 115 on the client computer receives the entered password from the user (step 802). Then, the secure virtual keyboard application 115 encrypts the password using the public key (step 804). The encryption may be performed on the client computer by the cryptographic services provided by the operating system. The secure virtual keyboard application 115 may also apply a hash or MAC to the encrypted data for authentication and integrity checking upon receipt (step 806). Next, the secure virtual keyboard application 115 sends the encrypted password to the USB device (step 808). Finally, the USB device checks the hash or MAC to authenticate the integrity of the received password (step 810) and decrypts the password using the private key, and then stores the password (step 812).

The foregoing description of various embodiments provides illustration and description, but is not intended to be exhaustive or to limit the invention to the precise form disclosed. Modifications and variations are possible in light of the above teachings or may be acquired from practice in accordance with the present invention. It is to be understood that the invention is intended to cover various modifications and equivalent arrangements included within the spirit and scope of the appended claims.

What is claimed is:

1. A method in a data processing system for a secure virtual keyboard, comprising:
 displaying a virtual keyboard having keys on a display;
 displaying the virtual keyboard with a different layout of the keys on a subsequent display of the virtual keyboard;
 receiving an indication of a minimum time to hover a mouse pointer over a key on the virtual keyboard to activate the key;
 receiving an indication of the mouse pointer being over the key;
 determining if the mouse pointer is over the key longer than the indicated minimum time to hover;
 entering the key if it is determined that the mouse pointer is over the key longer than the indicated minimum time to hover;
 encrypting a transmission to a device communicating with the virtual keyboard; and
 transmitting the encrypted transmission to the device communicating with the virtual keyboard.

2. The method of claim 1, wherein encrypting the transmission further comprises encrypting the transmission with a public key.

3. The method of claim 1, further comprising:
 receiving the encrypted transmission; and
 decrypting the received encrypted transmission.

4. The method of claim 3, wherein the transmission is encrypted in a symmetric encryption protocol.

5. The method of claim 3, further comprising decrypting the received encrypted transmission with a private key.

6. The method of claim 5, wherein the transmission is encrypted in one of (1) the RSA protocol, and (2) the DH protocol.

7. The method of claim 1, wherein displaying the virtual keyboard is initiated by a USB device.

8. The method of claim 1, wherein the device generating the virtual keyboard is a USB device.

9. The method of claim 1, wherein the device generating the virtual keyboard is a website server.

10. The method of claim 1, further comprising changing the minimum time to hover the mouse pointer over a key on the virtual keyboard to activate the key.

11. The method of claim 1, wherein entering the key further comprises entering the key in a password window.

12. The method of claim 1, further comprising applying an authentication code to the transmission.

13. The method of claim 12, wherein the authentication code is one of: (1) a hash value and (2) a MAC.

14. A data processing system for a secure virtual keyboard, comprising:
- a display configured to display a virtual keyboard;
- a mouse configured to control a mouse pointer on the display;
- a memory configured to store instructions to instruct a processor to:
  - display the virtual keyboard having keys on the display;
  - display the virtual keyboard with a different layout of the keys on a subsequent display of the virtual keyboard;
  - receive an indication of a minimum time to hover the mouse pointer over a key on the virtual keyboard to activate the key;
  - receive an indication of the mouse pointer being over the key;
  - determine if the mouse pointer is over the key longer than the indicated minimum time to hover;
  - enter the key if it is determined that the mouse pointer is over the key longer than the indicated minimum time to hover;
  - encrypt a transmission to a device communicating with the virtual keyboard; and
  - transmit the encrypted transmission to the device communicating with the virtual keyboard; and
- a processor to execute the instructions.

15. The data processing system of claim 14, wherein the instructions further comprise encrypting the transmission with a public key.

16. The data processing system of claim 14, wherein the transmission is encrypted in one of: (1) the RSA protocol, and (2) the DH protocol.

17. The data processing system of claim 14, wherein the transmission is encrypted in a symmetric encryption protocol.

18. The data processing system of claim 14, further comprising a USB device configured to initiate the displaying of the virtual keyboard.

19. The data processing system of claim 18, wherein the device generating the virtual keyboard is the USB device.

20. The data processing system of claim 14, wherein the device generating the virtual keyboard is a website server.

21. The data processing system of claim 14, wherein the instructions further comprise changing the minimum time to hover the mouse pointer over a key on the virtual keyboard to activate the key.

22. The data processing system of claim 14, further comprising a password window configured to receive the entering of the key.

23. The data processing system of claim 14, further comprising applying an authentication code to the transmission.

24. The data processing system of claim 23, wherein the authentication code is one of: (1) a hash value and (2) a MAC.

* * * * *